(12) United States Patent
Zenno

(10) Patent No.: US 8,751,123 B2
(45) Date of Patent: Jun. 10, 2014

(54) CONTROL DEVICE AND CONTROL METHOD FOR TRANSMISSION MECHANISM, AND CONTROL METHOD FOR VEHICLE WITH ENGINE

(75) Inventor: Toru Zenno, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1254 days.

(21) Appl. No.: 12/426,788

(22) Filed: Apr. 20, 2009

(65) Prior Publication Data

US 2009/0271082 A1   Oct. 29, 2009

(30) Foreign Application Priority Data

Apr. 25, 2008   (JP) .................................. 2008-115726

(51) Int. Cl.
*G06F 7/00* (2006.01)
*G06F 17/00* (2006.01)
*G06F 19/00* (2011.01)

(52) U.S. Cl.
USPC .............................................. 701/67; 701/68

(58) Field of Classification Search
USPC ...................... 180/218, 219, 230; 701/67, 68
See application file for complete search history.

(56) References Cited

U.S. PATENT DOCUMENTS

| 5,067,599 A * | 11/1991 | Roder et al. ................... 477/176 |
| 5,860,892 A * | 1/1999 | Korenjak et al. .............. 477/180 |
| 6,502,681 B1 * | 1/2003 | Ota et al. ...................... 192/84.6 |
| 7,158,873 B2 * | 1/2007 | Eich et al. ........................ 701/68 |
| 8,108,114 B2 * | 1/2012 | Minami .......................... 701/67 |
| 2002/0060114 A1 * | 5/2002 | Maruyama .................... 192/3.63 |
| 2003/0163235 A1 * | 8/2003 | Tokura et al. ................... 701/67 |
| 2004/0236537 A1 * | 11/2004 | Eich et al. ...................... 702/182 |
| 2006/0116241 A1 | 6/2006 | Doebele et al. |
| 2006/0124422 A1 * | 6/2006 | Zenno ........................... 192/3.61 |
| 2006/0180363 A1 * | 8/2006 | Uchisasai et al. ............ 180/65.2 |
| 2007/0012538 A1 * | 1/2007 | Katakura et al. .............. 192/3.61 |
| 2007/0213164 A1 * | 9/2007 | Tasaka et al. .................. 475/119 |
| 2007/0275810 A1 * | 11/2007 | Sinojima et al. ............... 475/216 |

(Continued)

FOREIGN PATENT DOCUMENTS

| DE | 4229024 A1 | 3/1994 |
| DE | 4419633 A1 | 12/1994 |
| EP | 1826439 A1 | 8/2007 |
| JP | 2006-170229 | 6/2006 |

OTHER PUBLICATIONS

European Search Report for European Application No. 09251145 dated Feb. 1, 2012.

*Primary Examiner* — Jeffrey Shapiro
(74) *Attorney, Agent, or Firm* — Keating & Bennett, LLP

(57) ABSTRACT

A control device for a transmission including a clutch driven by an actuator mechanism, such as a motor, is provided. The control device controls the actuator so that the rider does not perceive generation of a braking force when the clutch is shifted from a disengaged state to an engaged state while traveling, thereby enhancing riding comfort. In performing the control to actuate a clutch from a disengaged state to an engaged state, the control device makes a determination about whether or not to restrict engagement of the clutch based on information about a rotational speed on an upstream side of the clutch and information about a rotational speed on a downstream side of the clutch. If it is determined that engagement of the clutch is to be restricted, the control device delays engagement of the clutch until the engine speed is increased to an acceptable level.

22 Claims, 12 Drawing Sheets

(56) References Cited

U.S. PATENT DOCUMENTS

2007/0294017 A1* 12/2007 Joshi et al. .................... 701/67
2008/0183350 A1* 7/2008 Noguchi ........................ 701/29
2009/0112428 A1* 4/2009 Sah ................................ 701/67
2009/0271082 A1* 10/2009 Zenno ............................ 701/68

* cited by examiner

| Rd [rpm] | Rc [rpm] |
|---|---|
| ~2000 | 0 |
| 1000 ~2000 | 100 |
| 2000 ~3000 | 200 |
| 3000 ~4000 | 300 |
| 4000 ~5000 | 400 |
| 5000 ~ | 500 |

*FIG. 7*

CONTROL DEVICE AND CONTROL METHOD FOR TRANSMISSION MECHANISM, AND CONTROL METHOD FOR VEHICLE WITH ENGINE

PRIORITY INFORMATION

This patent application is based on and claims priority under 35 U.S.C. §119 to Japanese Patent Application No. 2008-115726, filed on Apr. 25, 2008, which is hereby incorporated by reference.

TECHNICAL FIELD

The present invention relates to a control device and a control method for a transmission mechanism of a vehicle with an engine, and a vehicle with an engine, and in particular to a control device and a control method for controlling the engagement of a clutch in a vehicle with an engine including a clutch and a transmission each of which is driven by an actuator.

BACKGROUND

A vehicle with an actuator driven clutch to control the engagement of the engine and the transmission has already been put to practical use. In such a vehicle it is possible to automatically make a series of transmission operations such as clutch disengagement, gear shifts, and clutch reengagement based on a transmission command input by a rider.

When a vehicle with an engine starts traveling from a stand still state, accelerator operation by a rider and a rotational speed of the engine are detected, a clutch position is changed according to a result of the detection, and the clutch is shifted from the disengaged state to the engaged state. For example, Japanese Utility Application JP-A-2006-170229 discloses that starting control is initiated when the accelerator opening becomes larger than a prescribed opening and the clutch is moved and engaged as the engine speed increases.

Focusing on the state of the clutch, the starting control disclosed in Japanese Utility Application JP-A-2006-170229 is controlled to make a shift from a state where the clutch is disengaged to a state where the clutch is engaged. A clutch change in state from disengaged to engaged is typically used in starting the vehicle. However, such control is required not only in starting but also in other situations.

For example, there is a case when a vehicle may be coasting without the clutch being engaged and the operator wants to engage the clutch to travel under the power of the engine. This requires the clutch to make a shift from a disengaged state to an engaged state while the vehicle is moving at a certain speed. Such a situation does not frequently occur. However, engaging the clutch while the vehicle is in motion may occur, for example, when a vehicle stops or decelerates on a downhill. In addition, a situation may occur while traveling with the clutch disengaged and the engine stops running for some reason, such as turning off of a main key, and thereafter the main key is turned on again while still traveling under the force of momentum.

When a vehicle is traveling under its own momentum and the clutch is thereafter engaged, the rotational speed on the downstream side of the clutch, i.e., the rotational speed on the side of the driving wheel, can be higher than the rotational speed on the upstream side of the clutch, i.e., the rotational speed on the side of the engine. In this case, if the starting control disclosed in Japanese Utility Application JP-A-2006-170229 is used, the rotational speed on the downstream side of the clutch and, further, the rotational speed of the driving wheel may be abruptly decreased when the clutch is engaged. The abrupt decrease is caused because the rotational speed on the downstream side of the clutch is not taken into consideration by the starting control before engaging the clutch. This may result in an undesirably large braking force being applied to the vehicle, causing the riding comfort of the rider to deteriorate.

The present invention is made in consideration of such a problem and an object is to control the engagement of an actuator driven clutch from a disengaged state to an engaged state while the vehicle is traveling, without sacrificing riding comfort.

SUMMARY

To solve the above mentioned problems the present invention, in one aspect, provides a control device for a transmission mechanism of a vehicle with an engine including a clutch and a transmission each of which is driven by an actuator. The control device comprises an engagement control module for controlling the actuation of the clutch from an engaged state to a disengaged state, and a determination module for determining whether or not to restrict engagement of the clutch based on information about a rotational speed on an upstream side of the clutch and information about a rotational speed on a downstream side of the clutch, wherein when the engagement control module performs a control to actuate the clutch to an engaged state, the engagement control module restricts engagement of the clutch if the determination module determines engagement of the clutch should be restricted.

The present invention, in another aspect, also provides a control method for a transmission mechanism of a vehicle with an engine including a clutch and a transmission each of which is driven by an actuator. The control method comprises performing an engagement control step to actuate the clutch from a disengaged state to an engaged state, and determining in a determination step whether or not to restrict engagement of the clutch based on information about a rotational speed on an upstream side of the clutch and information about a rotational speed on a downstream side of the clutch, wherein the engagement control step includes restricting engagement of the clutch if the determination step determines engagement of the clutch is to be restricted when the engagement control step is being performed.

The present invention further provides a control method for a vehicle with an engine having a transmission mechanism including a clutch and a transmission each of which is driven by an actuator. The control method comprises performing an engagement control step to actuate the clutch from a disengaged state to an engaged state, and determining in a determination step whether or not to restrict engagement of the clutch based on information about a rotational speed on an upstream side of the clutch and information about a rotational speed on a downstream side of the clutch, wherein the engagement control step includes restricting engagement of the clutch is to be restricted when the engagement control step is being performed.

The control device and the control method for a transmission mechanism, and the control method for a vehicle with an engine, in accordance with the present invention allow control of clutch engagement in a vehicle with an actuator driven clutch in a manner to preserve riding comfort so that a rider does not perceive generation of a braking force when a clutch is shifted from a disengaged state to an engaged state while the vehicle is traveling.

BRIEF DESCRIPTION OF THE DRAWINGS

FIG. 7 is a table indicating the relationship between a downstream converted rotational speed and a prescribed value.

DETAILED DESCRIPTION

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
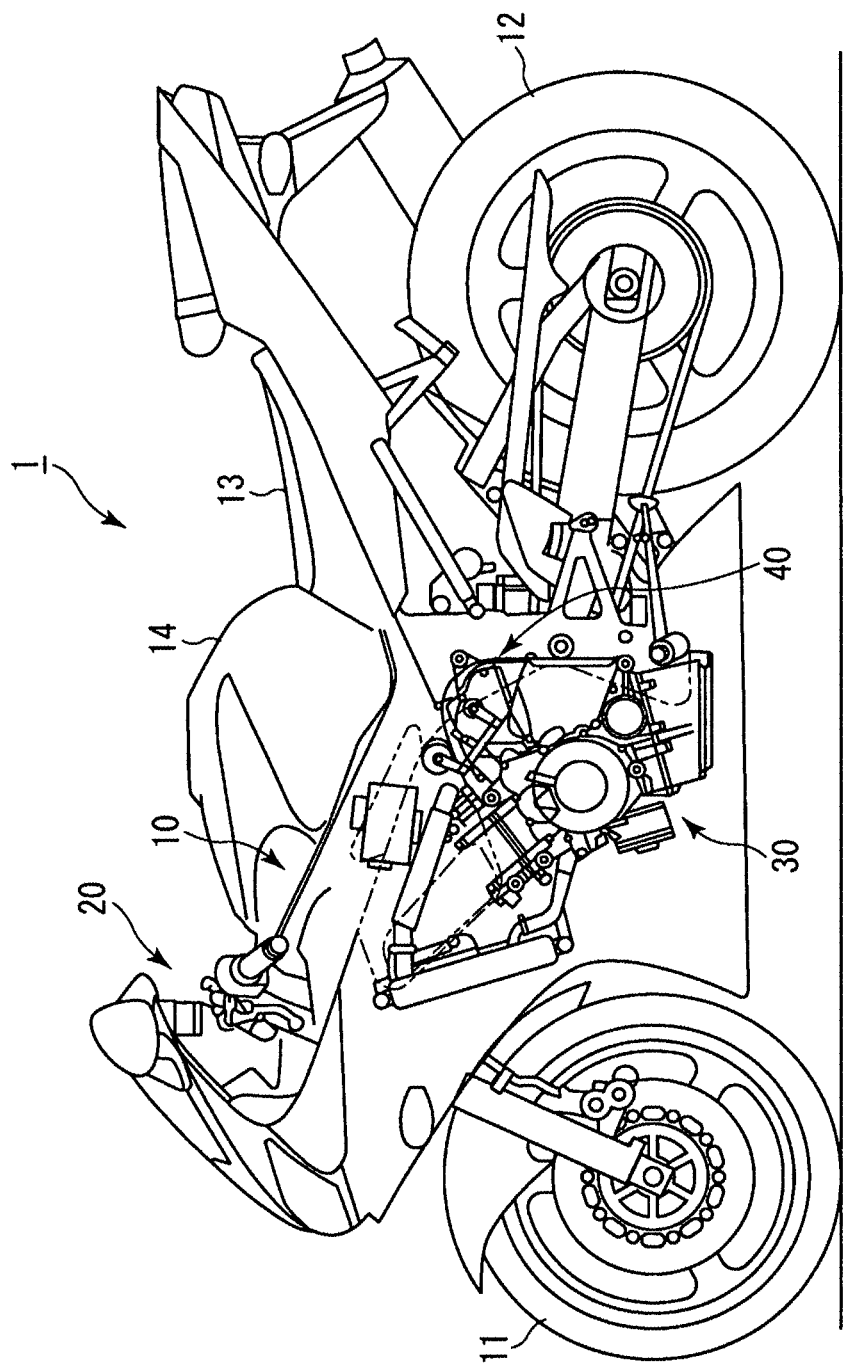
FIG. 1 illustrates an external side view of a motorcycle in accordance with an embodiment of the present invention.

FIG. 1 illustrates an external side view of a motorcycle in accordance with an embodiment. Motorcycle 1 shown in FIG. 1 has a construction generally similar to widely known motorcycles. The motorcycle 1 is constructed with a vehicle body frame 10, a front wheel 11 used for steering, a rear wheel 12 used as a driving wheel, a seat 13 on which a rider may be seated, a fuel tank 14, handlebars 20, an engine 30, a transmission mechanism 40, and so forth. A motorcycle is described herein as an example of a vehicle with an engine. However, the present invention is not limited thereto and the present invention may be suitably applied to various types of vehicles such as an All Terrain Vehicle (ATV), a three-wheeled or four-wheeled buggy, or a snowmobile.

Figure 2:
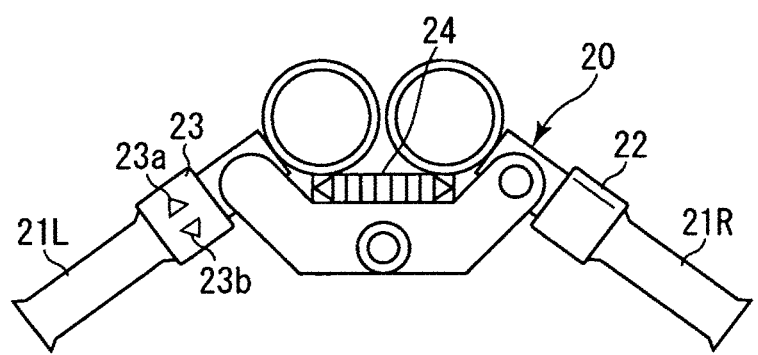
FIG. 2 illustrates a construction of the handlebars.

FIG. 2 illustrates a construction of the handlebars 20. As shown in the figure the handlebars 20 include a right grip 21R, which may be used to control acceleration. The rider rotates the right grip 21R, thereby inputting a command about an accelerator opening. An accelerator opening detector 22 is placed on the right grip 21R and detects the accelerator opening commanded by the rider. A shift switch 23 is placed on a left grip 21L of the handlebars 20. A shift-up switch 23a and a shift-down switch 23b are provided in the shift switch 23. The rider manually operates the switches, thereby allowing the rider to shift the gear positions of the transmission mechanism 40 stepwise between the neutral position and the highest gear position. An indicator 24 for indicating a present gear position is provided at the center of the handlebars 20.

Figure 3:
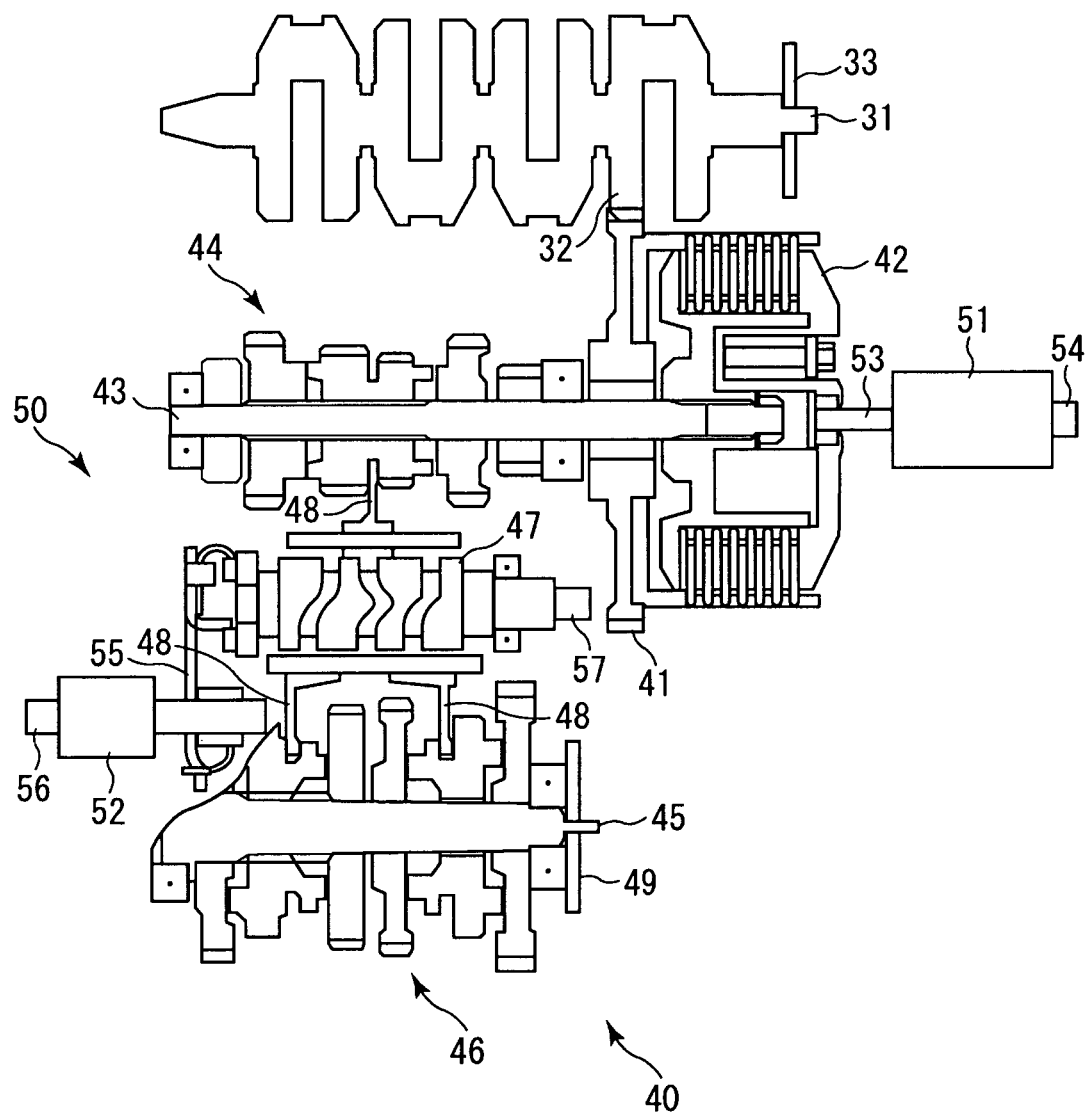
FIG. 3 illustrates a schematic drawing showing a construction of the transmission mechanism.

FIG. 3 is a schematic drawing showing a possible construction of the transmission mechanism 40. Power generated by the engine 30 is transmitted to a primary driven gear 41, provided in the transmission mechanism 40, via a primary drive gear 32, provided on a crankshaft 31. An engine tachometer 33 is mounted at an end of the crankshaft 31. The gear ratio between the primary drive gear 32 and the primary driven gear 41 is called the "primary reduction gear ratio".

Power input to the primary driven gear 41 is transmitted to a main shaft 43 via a clutch 42. A wet type multiple disc clutch is shown as the clutch 42 in FIG. 3. However, the clutch 42 is not limited thereto, but may be any one of a number of various types of known clutches, including, for example, a dry type clutch or a single disc clutch.

Multiple speed changing gears 44 are provided on the main shaft 43. The speed changing gears 44 are engaged with speed changing gears 46 provided on a drive shaft 45. Although FIG. 3 shows the speed changing gears 44 and 46 as if they were spaced from each other for added clarity and so the shift cam 47 and shift forks 48 may be viewed, they are actually engaged with each other as described above. Power is transmitted from the main shaft 43 to the drive shaft 45 via a single selected pair of speed changing gears 44 and 46. The remaining pairs of speed changing gears 44 and 46 idle. A shift cam 47 is rotated and a shift fork 48 is actuated, thereby selecting a pair of the speed changing gears 44 and 46 for power transmission. The main shaft 43, the speed changing gears 44, the drive shaft 45, the speed changing gears 46, the shift cam 47, and the shift forks 48 described above construct a transmission 50 known as a dog clutch type transmission. Although a dog clutch transmission is shown, other types of transmissions may be used as well, including, for example, a synchromesh type transmission.

Power transmitted to the drive shaft 45 is transmitted to the rear wheel 12 via a widely known power transmission mechanism (not shown) such as chain mechanism, belt mechanism, or drive shaft mechanism, and used as the driving force of the motorcycle 1. The rotational speed ratio between the drive shaft 45 and the rear wheel 12, provided by the power transmission mechanism, is known as the "secondary reduction gear ratio". A drive shaft tachometer 49 is mounted at an end of the drive shaft 45.

In the transmission mechanism 40 of this embodiment, the clutch 42 and the transmission 50 are driven by a clutch actuator 51 and a shift actuator 52. The clutch actuator 51 expands and contracts a rod 53, and thereby makes the clutch 42 disengaged, engaged, or half-engaged. A clutch actuator position detector 54, for detecting a position of the clutch actuator 51, is placed on the clutch actuator 51. The shift actuator 52 rotates a shift arm 55 which in turn rotates the shift cam 47 by a prescribed angle, thereby shifting the gears of the transmission 50 up or down. A potentiometer 56, for detecting a rotational angle of the shift actuator 52, is placed on the shift actuator 52. A shift position detector 57, for detecting a present gear position, is mounted at an end of the shift cam 47. Known electric motors such as servomotors and stepping motors and known actuators such as hydraulic motors and hydraulic cylinders can be preferably used for the clutch actuator 51 and the shift actuator 52. In FIG. 3, the clutch actuator 51 and the shift actuator 52 are shown directly connected to the rod 53 and the shift arm 55, respectively. However, the connection may be properly made via a gear mechanism, a linkage mechanism, and so forth. Further, known sensors such as rotary encoders and linear encoders can be used for the clutch actuator position detector 54. Potentiometers, photoswitches, or proximity switches can be used for the shift position detector 57.

Figure 4:
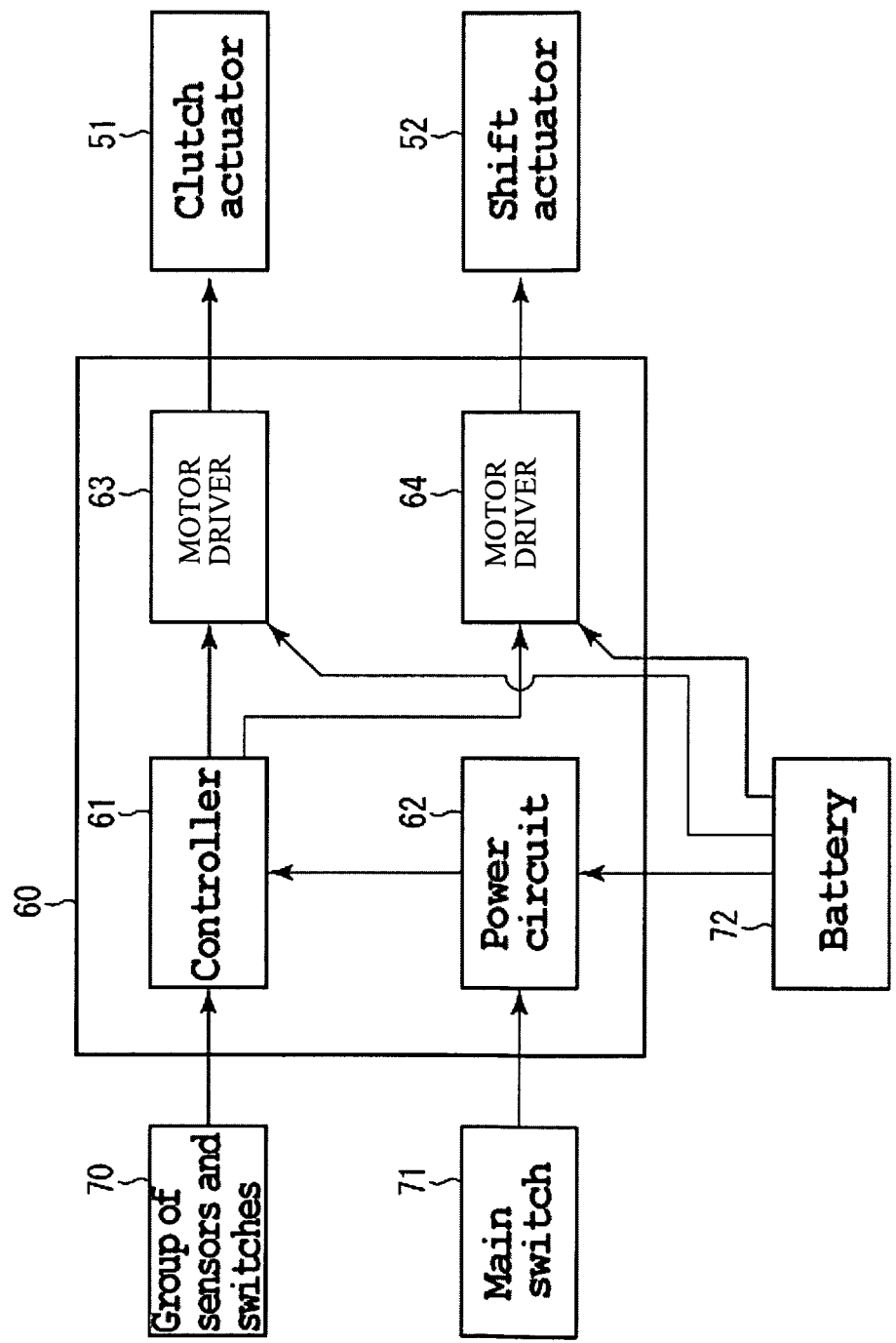
FIG. 4 is a block diagram of a control system.

FIG. 4 is a block diagram of a control system installed in the motorcycle 1. A group of sensors and switches 70, a main switch 71 to be turned on in response to a key switch, a battery 72 for supplying electric power to a control device 60, the clutch actuator 51, and the shift actuator 52 are connected to the control device 60.

The control device 60 includes a controller 61, a power circuit 62, and motor drivers 63 and 64. The controller 61 may be constructed with a Digital Signal Processor (DSP), microcontroller, or other known processor device. The controller 61 outputs a signal to the motor drivers 63 and 64 based on various information indicating the state of each part of the motorcycle 1, which is input from the group of sensors and switches 70, and a command from the rider, and actuates the clutch actuator 51 and the shift actuator 52, thereby controlling the transmission mechanism 40. A program for causing the controller 61 to operate is provided by a nonvolatile memory such as ROM or flash memory built in the controller 61. In response to the main switch 71, the power circuit 62 adjusts voltage, current, and other electrical properties of the power supplied from the battery 72 to the controller 61. In response to a signal output from the controller 61, the motor driver 63 is supplied with power from the battery 72 and actuates the clutch actuator 51. The motor driver 64 actuates the shift actuator 52 in the same way.

Figure 5:
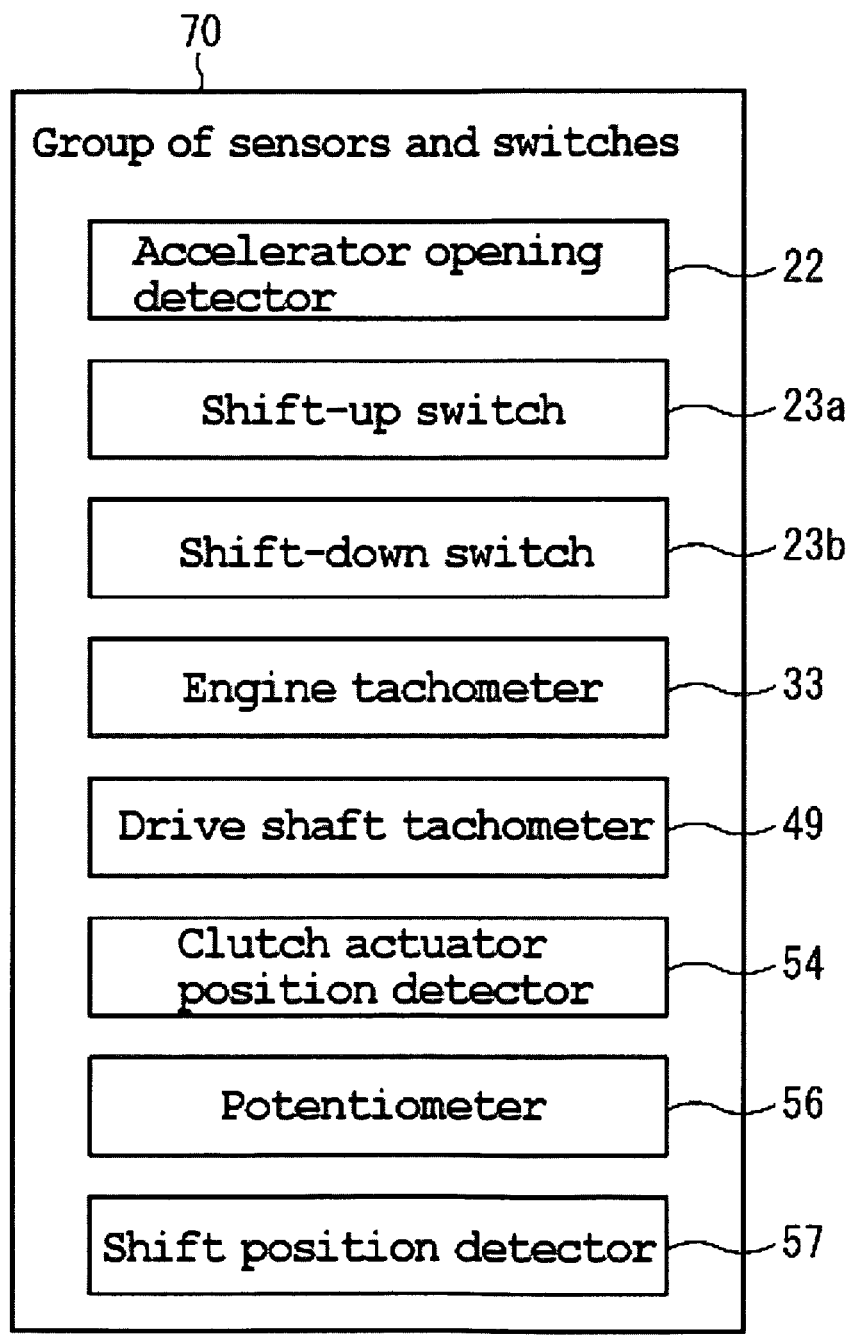
FIG. 5 is a diagram showing a construction of a group of sensors and switches.

FIG. 5 is a diagram showing a construction of the group of sensors and switches 70 connected to the control device 60. The group of sensors and switches 70 includes the accelerator opening detector 22, the shift-up switch 23a, the shift-down switch 23b, the engine tachometer 33, the drive shaft tachometer 49, the clutch actuator position detector 54, the potentiometer 56, and the shift position detector 57. Information obtained from the group of sensors and switches 70 is constantly input to the controller 61.

Hereinafter, a detailed descriptions will be made regarding control of the transmission mechanism in shifting the clutch 42 from the disengaged state to the engaged state in the motorcycle 1 having the construction described above.

Figure 6:
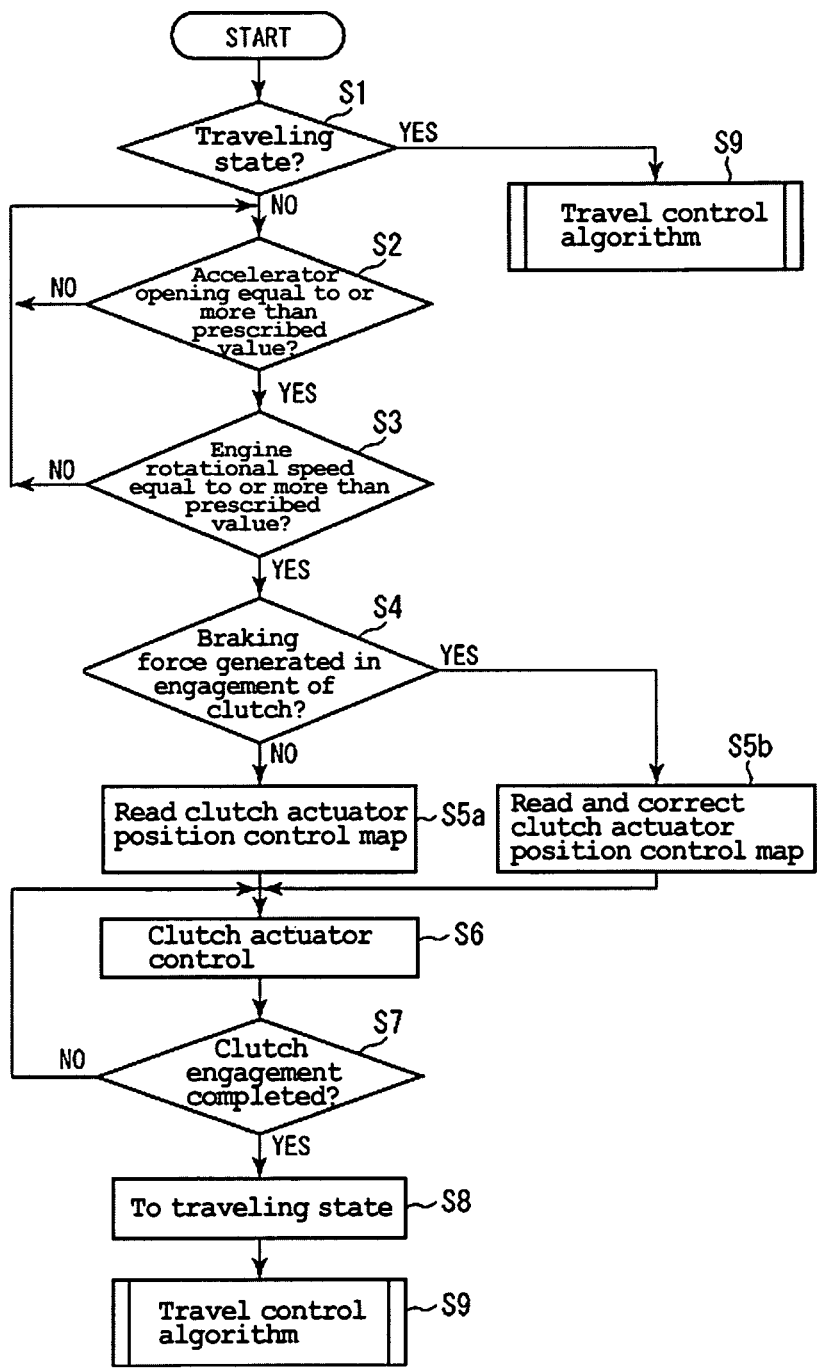
FIG. 6 is a flowchart of an algorithm executed by a control device to perform a control to shift a clutch from the disengaged state to the engaged state.

FIG. 6 is a flowchart of an algorithm that is executed by the control device 60 when the control device 60 performs a control to shift the clutch 42 from the disengaged state to the engaged state. Description will be made along the flowchart. First, the control device 60 determines whether or not the motorcycle 1 is in a traveling state (step S1). The control device 60 has a flag therein for storing whether or not the motorcycle 1 is in the traveling state. The determination is made by checking contents of the flag. The flag is set to indicate that the motorcycle 1 is not in the traveling state immediately after turning on the key switch from the stand still state. In addition, the flag may be set to indicate that the motorcycle 1 is not in the traveling state when a prescribed condition is satisfied, such as when the traveling speed becomes a prescribed value, for example, a speed of 3 km/h or less. If during step S1 it is determined that the motorcycle 1 is in the traveling state, the control device 60 executes a control algorithm (step S9) for performing control in the traveling state. If during step S1 it is determined that the motorcycle 1 is not in the traveling state, the control device 60 goes to step S2.

When the motorcycle 1 is not in the traveling state, the clutch 42 is disengaged. A condition for engaging the clutch 42 from this starting state is that the rider rotates the right grip 21R until the accelerator opening reaches a threshold value or larger (step S2). In addition, the engine rotational speed preferably reaches a threshold value (for example, 1300 [rpm]) or higher (step S3).

If the condition in step S3 is satisfied, the control device 60 determines whether or not the engagement of the clutch 42 should be restricted (step S4). A program, which may be stored in memory, may be executed by the control device 60 in order to make the determination on whether or not to restrict engagement of the clutch 42. The determination is preferably made based on a determination of whether or not the rotational speed of the downstream side of the clutch 42 is higher by a prescribed value or more than the rotational speed of the upstream side of the clutch 42 based on information about the rotational speed of the upstream side of the clutch 42 and information about the rotational speed of the downstream side of the clutch 42.

The downstream side of the clutch 42 is connected to the rear wheel 12 via the transmission 50 and the power transmission mechanism (not shown). Therefore, the rotational speed on the downstream side of the clutch 42 corresponds to the speed of the motorcycle 1. On the other hand, the rotational speed on the upstream side of the clutch 42 corresponds to the rotational speed of the engine 30. Consequently, if an attempt to engage the clutch 42 is made with the rotational speed of the downstream side of the clutch 42 greater than the rotational speed on the upstream side of the clutch 42, the rotational speed on the downstream side of the clutch 42 will decrease and the rotational speed on the upstream side of the clutch 42 will increase. Engagement is completed when a state of equilibrium is reached and both the rotational speeds coincide with each other. As a result, the speed of the motorcycle 1 decreases and the rotational speed of the engine 30 increases. This generates a braking force on the motorcycle 1.

If the rotational speed on the upstream side of the clutch 42 is close to the rotational speed on the downstream side of the clutch 42, the difference is smoothly absorbed in the process of engagement of the clutch 42, and the rider hardly perceives any braking force. Accordingly, it is advisable that the determination as to whether or not to restrict engagement of the clutch 42 be made by analyzing whether or not the rider will perceive any braking force due to the engagement of the clutch 42. As explained above this can be accomplished by analyzing whether or not the rotational speed on the downstream side of the clutch 42 is higher by a prescribed value or more than the rotational speed on the upstream side of the clutch 42, when the clutch 42 is to be engaged.

More specifically, the control device 60 in the present embodiment makes the determination described above using an upstream converted rotational speed Ru, which is the rotational speed on the upstream side of the clutch 42 converted into the rotational speed of the engine 30, and a downstream converted rotational speed Rd, which is the rotational speed on the downstream side of the clutch 42 converted into the rotational speed of the engine 30. An output value of the engine tachometer 33, which is information about the rotational speed on the upstream side of the clutch 42, can be used for the upstream converted rotational speed Ru. On the other hand, the downstream converted rotational speed Rd may be obtained by first reading the drive shaft tachometer 49 provided for detecting the vehicle speed. In particular, the drive shaft tachometer 49 output value, which constitutes information about the rotational speed on the downstream side of the clutch 42, may be multiplied by a present gear ratio of the transmission 50 and the primary reduction gear ratio to obtain the downstream converted rotational speed Rd. The present gear ratio of the transmission 50 can be obtained by detecting the gear position with the shift position detector 57. The rotational speed difference $\Delta R$ between the downstream converted rotational speed Rd and the upstream converted rotational speed Ru, can be calculated using the following formula:

$$\Delta R = Rd - Ru$$

ΔR can then be compared against a prescribed value Rc to determine whether or not to restrict engagement of the clutch 42 based on whether the inequality of equation (1) below is satisfied.

$$\Delta R \geq Rc \quad (1)$$

If the inequality is satisfied the clutch 42 will be restricted from engagement. If the inequality is not satisfied the clutch will not be restricted from engagement.

The prescribed value Rc can be an arbitrary value equal to or larger than 0, for example, 100 [rpm]. However, even if the rotational speed difference ΔR is the same in two different situations, the amount of braking force acting on the motorcycle 1 in each situation can differ depending on the downstream converted rotational speed Rd. Therefore, it is preferable that the prescribed value Rc be set according to the downstream converted rotational speed Rd. The prescribed value Rc can be set in a number of ways. For example, the prescribed value Rc can be set using a lookup table like the one shown in FIG. 7. In addition, the downstream converted rotational speed Rd may be multiplied by an arbitrary coefficient α to determine the prescribed value Rc.

$$Rc = \alpha Rd \quad (2)$$

As an example, the coefficient α can be 0.1; however, the coefficient α can be set to any positive coefficient. The smaller the coefficient α becomes the less the amount of rotational speed difference ΔR required to restrict engagement of the clutch 42.

While a simple linear relationship was used in equation (2) to express the relationship between the prescribed value Rc and the converted rotational speed Rd, a more complicated function may also be used.

Further, in the embodiment described above, the upstream converted rotational speed Ru and the downstream converted rotational value Rd are converted into the rotational speed of the engine 30. However, arbitrary converted values in any common frame of reference may be used instead. For example, the values could be converted to the rotational speed of the main shaft 43 or the speed of the motorcycle 1.

Further, in the described embodiment, the upstream converted rotational speed Ru and the downstream converted rotational speed Rd are obtained by a calculation on the output values of the engine tachometer 33 and the drive shaft tachometer 49, respectively. However, other sources of rotational information may be used such as tachometers separately mounted on parts upstream and downstream of the clutch 42, thereby directly measuring the rotational speeds.

Figure 8:
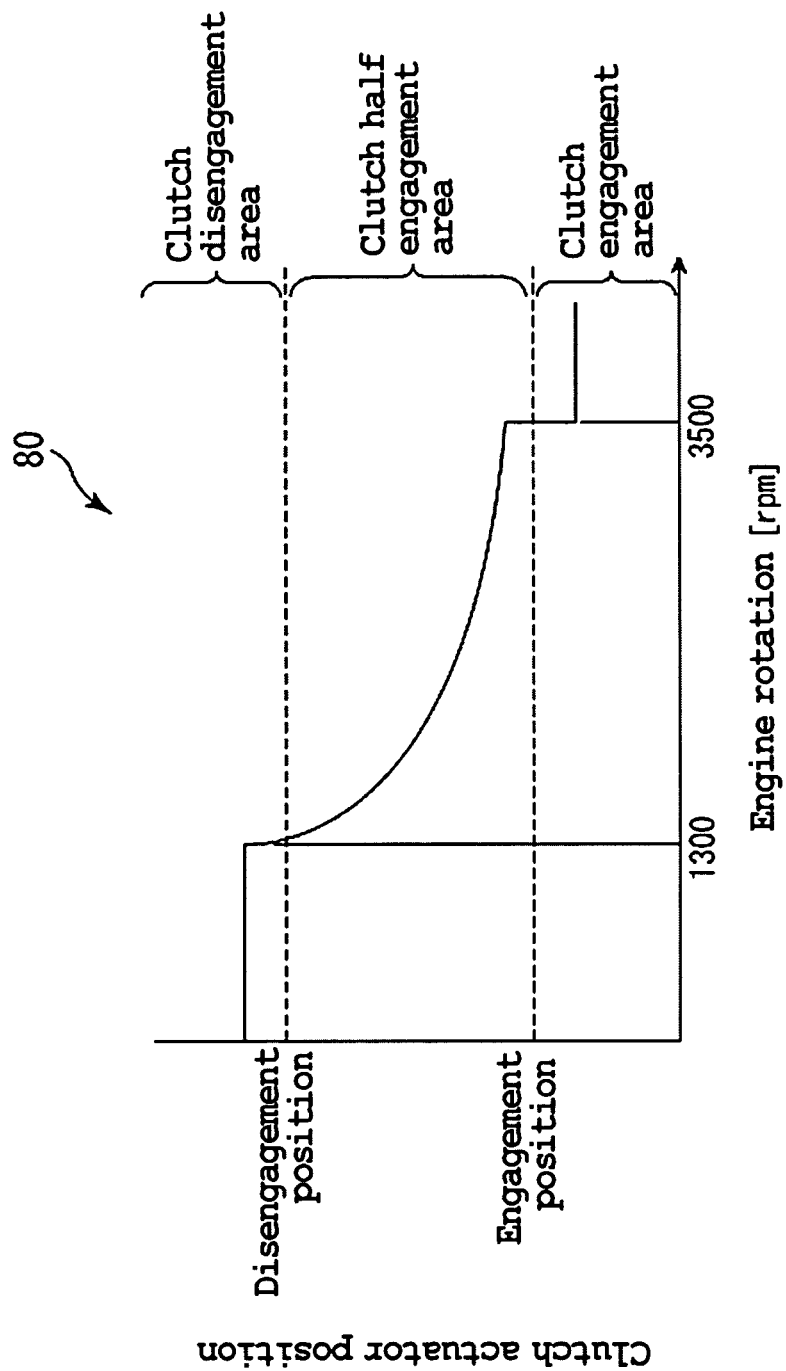
FIG. 8 illustrates a clutch actuator position control map.

If it is determined not to restrict engagement of the clutch 42 in step S4, the control device 60 reads a clutch actuator position control map 80 shown in FIG. 8 from memory, such as Read Only Memory (ROM), Erasable Programmable Read Only Memory (EPROM), Flash memory, or any other type of information storage device. (not shown) (step S5a). The clutch actuator position control map 80 shows the relationship between the rotational speed of the engine 30 and the clutch actuator position. The map has the rotational speed of the engine 30 as the horizontal axis and the clutch actuator position as the vertical axis and indicates the relationship between them with lines. In the map, the clutch 42 is completely disengaged and idling when the clutch actuator position is in a clutch disengagement area above the disengagement position. The clutch 42 is completely engaged and rotates without sliding when the clutch actuator position is in a clutch engagement area below the engagement position. When the clutch actuator position is in the half engagement area between the disengagement area and the engagement area, the clutch 42 is in a so-called half-engaged state and transmits torque while sliding.

Next, the control device 60 controls the clutch actuator 51 based on the clutch actuator position read from control map 80 (step S6). Specifically, the control device 60 detects the present rotational speed of the engine 30 by the engine tachometer 33 and obtains a target clutch actuator position from the clutch actuator position control map 80. Next, the control device 60 actuates the clutch actuator 51 so that it comes to the target clutch actuator position. A program is typically used to allow the control device 60 to determine when to actuate the clutch 42 from the disengaged state to the engaged state.

The control device 60 continues to analyze and adjust engagement of the clutch 42 until engagement of the clutch 42 is completed. The engagement of the clutch is complete when the clutch actuator position detector 54 detects that the clutch 42 is in a position that it is engaged (step S7). If engagement of the clutch 42 is completed, the control device 60 rewrites the internal flag with contents indicating that the motorcycle 1 is in the traveling state (step S8) and executes the control algorithm for traveling state (step S9).

Figure 9:
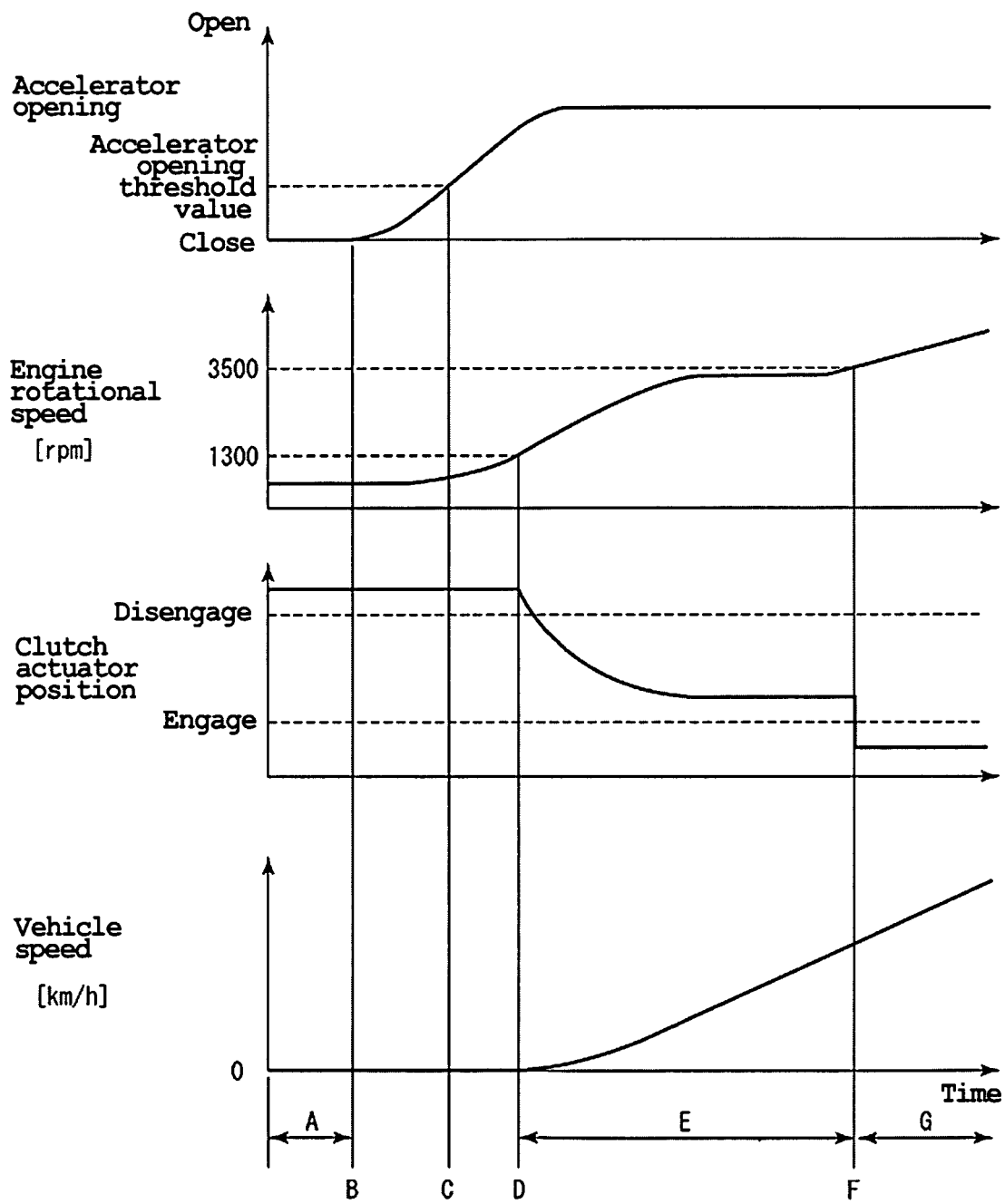
FIG. 9 is a diagram illustrating the behavior of the motorcycle in a situation in which when it is determined that a braking force will not be generated on the motorcycle.

FIG. 9 is a diagram illustrating the behavior of the motorcycle 1 in the case that it is determined not to restrict engagement of the clutch 42, via the clutch actuator 51, as described above. The horizontal axes of the diagrams represent time. They are diagrammatic drawings indicating changes in the accelerator opening, the engine rotational speed, the clutch actuator position, and the vehicle speed, in this order from top to bottom. Description will be herein made about a case where the vehicle starts from a stand still state and it is determined not to restrict engagement of the clutch 42.

First, a section represented by an area (A) in the figure indicates a state where the motorcycle 1 is standing still. At this point, the rider has not rotated the right grip 21R and the accelerator opening is in the fully closed position. The engine 30 is in the idling state. The clutch 42 is disengaged. The vehicle speed is 0 because the motorcycle 1 is standing still.

Now, when the rider starts rotating the right grip 21R to start the motorcycle 1 ((B) in the figure), the engine rotational speed increases with a slight delay. When the accelerator opening reaches the accelerator opening threshold value or larger ((C) in the figure), and further the engine rotational speed exceeds the engine rotational speed threshold value (1300 [rpm] in this case)((D) in the figure), the control device 60 determines whether or not to restrict engagement of the clutch 42. The vehicle speed is 0 in this case, and the downstream converted rotational speed Rd is of course 0. Thus, $$\Delta R = Rd - Ru = -1300 \text{ [rpm]}$$

Meanwhile, $$Rc = 0 \text{ [rpm]}$$

Therefore, (see FIG. 7)

$$\Delta R < Rc$$

Consequently, the inequality (1) is not satisfied, and it is determined not to restrict engagement of the clutch 42.

Next, the control device 60 reads the clutch actuator position control map 80 and controls the clutch 42 so that it enters the half-engaged state according to the engine rotational speed. This causes the motorcycle 1 to smoothly start and gradually increase its speed (area (E) in the figure).

When the engine rotational speed has sufficiently increased (3500 [rpm] in this case), the clutch 42 is completely engaged ((F) in the figure). At this point, the control device 60 determines that engagement of the clutch 42 has been completed. Thereafter, the control device 60 shifts to control for the traveling state and thereafter uses the control algorithm for the traveling state (area (G) in the figure).

Figure 10A:
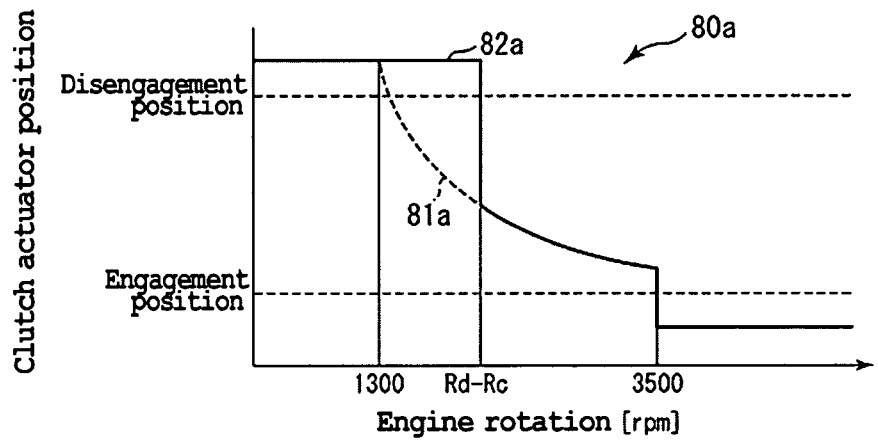
FIGS. 10A through 10C are diagrams useful in explaining how corrections to the clutch actuator position control map may be made.

Returning to FIG. 6, a description will now be made about a case when it is determined to restrict engagement of the clutch 42 in step S4. In this case, the control device 60 goes to step S5b, reads the clutch actuator position control map 80, and makes a correction to the clutch actuator position control map 80. FIG. 10A is a diagram explaining the correction to the clutch actuator position control map 80. The control device 60 rewrites an area represented by a dashed line 81a as indicated by a thick line 82a, and retains the clutch 42 in the disengaged state until the rotational speed of the engine 30 exceeds (Rd−Rc), thereby restricting the ability of the clutch 42 to engage. This is done because a braking force will be generated on the motorcycle 1 if the clutch 42 is engaged when the rotational speed of the engine 30 is below (Rd−Rc) according to inequality (1). A clutch actuator position control map 80a that has been corrected can be obtained in the manner described above.

Figure 10B:
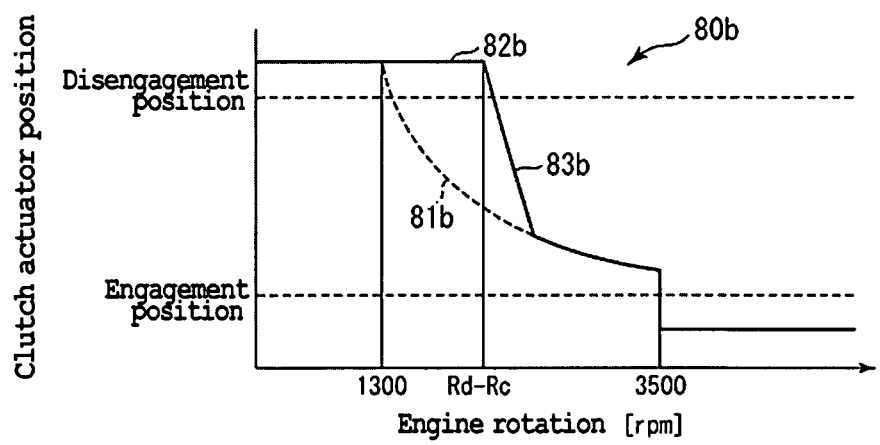

Correction to the clutch actuator position control map 80 may also be made in a manner indicated by a clutch actuator position control map 80b as shown in FIG. 10B. The position of the clutch 42 represented by an area of a dashed line 81b in the figure is rewritten as indicated by a thick line 82b until the rotational speed of the engine 30 exceeds (Rd−Rc). After that area, the line is connected to a line before the correction with a line 83b having a prescribed slope. Thereby, the operation to engage the clutch 42 may be restricted from engagement.

Figure 10C:
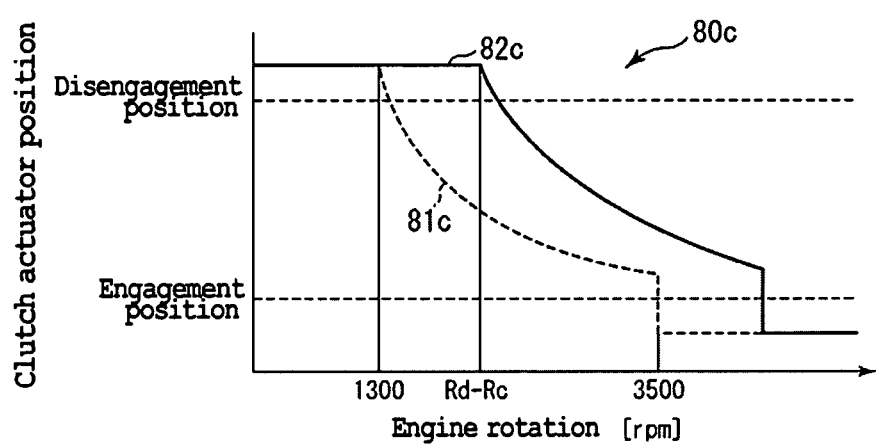

In contrast to adjusting a portion of the curve of the clutch actuator position control map 80, the entire curve may be shifted. In the clutch actuator position control map 80c shown in FIG. 10C, an area represented by a dashed line 81c is rewritten as indicated by a thick line 82c, and the clutch actuator position control map 80 itself is shifted towards a higher engine 30 rotational speed. This causes engagement of the clutch 42 to be restricted until the rotational speed of the engine 30 exceeds (Rd−Rc).

While the above examples refer to (Rd−Rc) as a threshold value to compare against an engine 30 rotational speed, in alternative implementations, the downstream converted rotational speed Rd may be used as a threshold value for restriction of operation to engage the clutch 42 instead of (Rd−Rc) as described above.

After correction, the control device 60 goes to step S6 in FIG. 6 and performs control of the clutch actuator 51 based on the corrected clutch actuator position control map 80a. The steps after this point are the same as described above, and a duplicate description will not be made.

Figure 11:
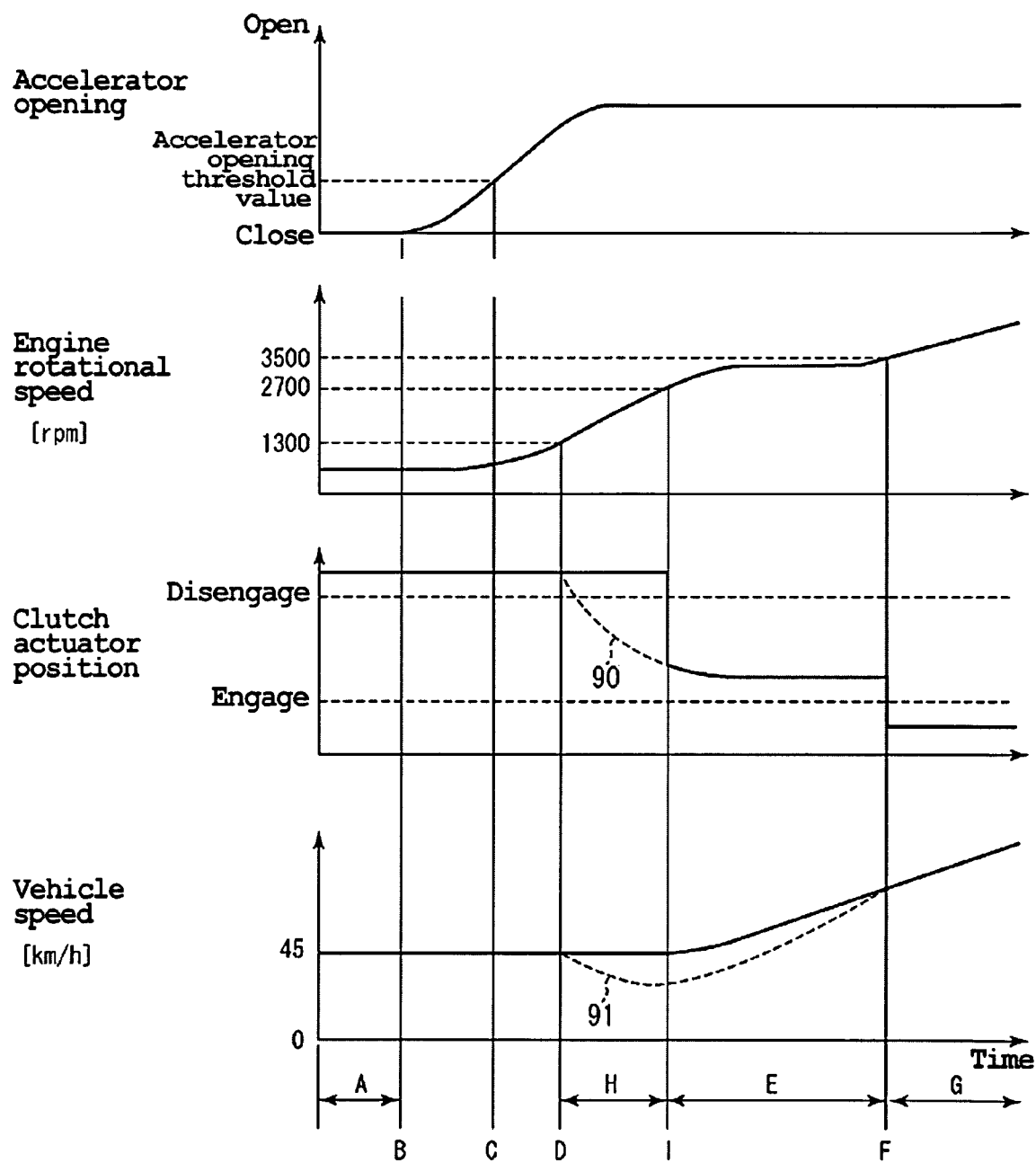
FIG. 11 is a diagram illustrating the behavior of the motorcycle when it is determined that a braking force will be generated on the motorcycle.

FIG. 11 is a diagram illustrating the action of the motorcycle 1 in the case that it is determined to restrict engagement of the clutch 42. In the figure, similar to FIG. 9, the horizontal axes of the diagrams represent time. They are diagrammatic drawings indicating changes in the accelerator opening, the engine rotational speed, the clutch actuator position, and the vehicle speed, in this order from top to bottom.

In the case represented by FIG. 11, in an initial state, the accelerator opening is in the fully closed position, the clutch 42 is disengaged, the engine 30 is in the idling state, and the motorcycle 1 is traveling with momentum at a speed of 45 [km/h] (area (A)).

In order to construct a detailed example for description, it will be assumed that the primary reduction gear ratio of the motorcycle 1 is 2.0, the present gear position of the transmission 50 is the second gear with a gear ratio of 2.0, the secondary reduction gear ratio is 2.0, and an outer circumference of the rear wheel is 2 [m]. Many other combinations exist. In this case, the downstream converted rotational speed Rd is:

$$Rd=45\times(1000/60)\div 2\times 2.0\times 2.0\times 2.0=3000 \text{ [rpm]}$$

Referring to FIG. 7, the prescribed value Rc in this case is assumed to be:

$$Rc=300 \text{ [rpm]}$$

If the rider rotates the right grip 21R and the rotational speed of the engine 30 reaches 1300 [rpm], which is the engine rotational speed threshold value ((D) in the figure), the control device 60 determines whether or not braking force would act on the motorcycle 1 if the clutch 42 is engaged. In this case:

$$\Delta R=Rd-Ru=1700 \text{ [rpm]}$$

Meanwhile, $$Rc=300 \text{ [rpm]}$$

$$\Delta R>Rc$$

The inequality (1) is satisfied and therefore the clutch 42 is restricted from engagement.

Then, the control device 60 reads and corrects the clutch actuator position control map 80. In this case, the clutch actuator position control map 80a shown in FIG. 10A is obtained by correction. A specific value for the value expressed as (Rd−Rc) in the figure is 2700 [rpm].

Again returning to FIG. 11, the control device 60 controls the clutch actuator 51 using the corrected clutch actuator position control map 80a. Therefore, while the rotational speed of the engine 30 exceeds the engine rotational speed threshold value ((D) in the figure), the control device 60 further restricts engagement of the clutch 42 until the rotational speed of the engine 30 reaches 2700 [rpm] (area (H) in the figure).

When the rotational speed of the engine 30 reaches 2700 [rpm], engagement of the clutch 42 is started ((I) in the figure). At this point, the rotational speeds on the upstream and downstream sides of the clutch 42 are close to being equal. Therefore, the motorcycle 1 smoothly starts acceleration as indicated in the figure. Accordingly, the rider does not perceive braking force being generated.

Thereafter, the clutch 42 is controlled so that it stays in the half-engaged state (area (E) in the figure) until the engine rotational speed sufficiently increases and the clutch 42 is completely engaged ((F) in the figure). After this point, the control device 60 shifts to the control algorithm for the traveling state (area (G) in the figure).

The dashed lines represented by reference numerals 90 and 91 in FIG. 11 are referential lines indicating changes in the clutch actuator position and the vehicle speed of the motorcycle 1 in the case that the clutch actuator position control map 80 is used without any correction. In this case, as indicated by the dashed line 90, engagement of the clutch 42 is started at a point (D) in the figure. Therefore, as indicated by the dashed line 91, the speed of the motorcycle 1 temporarily decreases. Braking force generated at this point results in deterioration in the riding comfort of the rider.

As described in the foregoing, the control device and control method for a transmission mechanism of a vehicle with an engine, and the vehicle with an engine, in accordance with the present invention allows control with riding comfort so that the rider does not perceive the generation of a braking force when the clutch is shifted from the disengaged state to the engaged state while the vehicle is traveling.

What is claimed is:

1. A control device for a single-clutch transmission mechanism of a vehicle with an engine including only one clutch and a transmission each of which is driven by an actuator, comprising:
   an engagement control module operatively coupled to the actuator to control the actuation of the only one clutch from a disengaged state to an engaged state; and
   a determination module operatively coupled to the actuator and operatively configured to determine whether or not to restrict engagement of the only one clutch based on information about a rotational speed on an upstream side of the only one clutch and information about a rotational speed on a downstream side of the only one clutch, wherein when the engagement control module performs a control to actuate the only one clutch to an engaged state, the engagement control module restricts engagement of the only one clutch if the determination module determines that the rotational speed on the downstream side of the only one clutch is higher by a prescribed value or more than the rotational speed on the upstream side of the only one clutch.

2. The control device for a single-clutch transmission mechanism according to claim 1, wherein the information about a rotational speed on the upstream side of the only one clutch is a rotational speed of the engine.

3. The control device for a single-clutch transmission mechanism according to claim 1, wherein the information about a rotational speed on the downstream side of the only one clutch is information about a speed of the vehicle.

4. The control device for a single-clutch transmission mechanism according to claim 3, wherein the information about a rotational speed on the downstream side of the only one clutch is a rotational speed of a drive shaft.

5. The control device for a single-clutch transmission mechanism according to claim 1, wherein the prescribed value is set according to the information about the rotational speed on the downstream side of the only one clutch.

6. The control device for a single-clutch transmission mechanism according to claim 1, wherein the engagement control module restricts operation to engage the only one clutch by retaining the only one clutch in the disengaged state.

7. A control device for a single-clutch transmission mechanism of a vehicle with an engine including only one clutch and a transmission each of which is driven by an actuator, comprising:
   an engagement control module operatively coupled to the actuator to control the actuation of the only one clutch from a disengaged state to an engaged state; and
   a determination module operatively coupled to the actuator and operatively configured to determine whether or not to restrict engagement of the only one clutch based on information about a rotational speed on an upstream side of the only one clutch and information about a rotational speed on a downstream side of the only one clutch, wherein when the engagement control module performs a control to actuate the only one clutch to an engaged state, the engagement control module restricts engagement of the only one clutch if the determination module determines engagement of the only one clutch is to be restricted, wherein the determination module updates a clutch actuator position control map when the determination module determines engagement of the only one clutch is to be restricted.

8. A vehicle with an engine comprising the control device for a single-clutch transmission mechanism according to claim 1.

9. A vehicle with an engine comprising the control device for a single-clutch transmission mechanism according to claim 2.

10. A vehicle with an engine comprising the control device for a single-clutch transmission mechanism according to claim 3.

11. A vehicle with an engine comprising the control device for a single-clutch transmission mechanism according to claim 4.

12. A vehicle with an engine comprising the control device for a single-clutch transmission mechanism according to claim 5.

13. A vehicle with an engine comprising the control device for a single-clutch transmission mechanism according to claim 6.

14. A vehicle with an engine comprising the control device for a single-clutch transmission mechanism according to claim 7.

15. A control device implemented control method for a single-clutch transmission mechanism for a vehicle with an engine including only one clutch and a transmission each of which is driven by an actuator, the control method comprising:
   a. performing an engagement control step to actuate the only one clutch from a disengaged state to an engaged state; and
   b. determining in a determination step whether or not to restrict engagement of the only one clutch based on information about a rotational speed on an upstream side of the only one clutch and information about a rotational speed on a downstream side of the only one clutch, wherein the engagement control step includes restricting engagement of the only one clutch if the determination step determines engagement of the only one clutch is to be restricted when the rotational speed on the downstream side of the only one clutch is higher by a prescribed value or more than the rotational speed on the upstream side of the only one clutch.

16. The method of claim 15, wherein the engagement control step includes actuating the only one clutch from a disengaged to an engaged state based on an actuator position control map, and the method further comprises generating a modified clutch actuator position control map if the determination step determines engagement of the only one clutch is to be restricted.

17. A control device implemented control method for a vehicle with an engine having a single-clutch transmission mechanism including a only one clutch and a transmission each of which is driven by an actuator, the control method comprising:
   a. performing an engagement control step to actuate the only one clutch from a disengaged state to an engaged state; and
   b. determining in a determination step whether or not to restrict engagement of the only one clutch based on information about a rotational speed on an upstream side of the only one clutch and information about a rotational speed on a downstream side of the only one clutch, wherein the engagement control step includes restricting engagement of the only one clutch if the determination step determines engagement of the only one clutch is to be restricted when the rotational speed on the downstream side of the only one clutch is higher by a prescribed value or more than the rotational speed on the upstream side of the only one clutch.

18. The method of claim 17, wherein the engagement control step includes actuating the only one clutch from a disengaged to an engaged state based on an actuator position control map, and the method further comprises generating a modified clutch actuator position control map if the determination step determines engagement of the only one clutch is to be restricted.

19. The control device for a single-clutch transmission mechanism according to claim 1, wherein the engagement control module retains the only one clutch in the disengaged state until the rotational speed on the upstream side of the only one clutch exceeds a predetermined value.

20. The control device for a single-clutch transmission mechanism according to claim 7, wherein the engagement control module retains the only one clutch in the disengaged state until the rotational speed on the upstream side of the only one clutch exceeds a predetermined value.

21. The method of claim 15, wherein the engagement control step includes retaining the only one clutch in the disengaged state until the rotational speed on the upstream side of the only one clutch exceeds a predetermined value.

22. The method of claim 17, wherein the engagement control step includes retaining the only one clutch in the disengaged state until the rotational speed on the upstream side of the only one clutch exceeds a predetermined value.

\* \* \* \* \*